(12) United States Patent
Hur et al.

(10) Patent No.: US 12,307,644 B2
(45) Date of Patent: May 20, 2025

(54) INSPECTION DEVICE FOR VEHICLE AND METHOD FOR INSPECTING THE VEHICLE

(71) Applicants: Hyundai Motor Company, Seoul (KR); Kia Corporation, Seoul (KR)

(72) Inventors: Minhoe Hur, Seoul (KR); Jaesik Min, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 487 days.

(21) Appl. No.: 17/548,927

(22) Filed: Dec. 13, 2021

(65) Prior Publication Data

US 2022/0301148 A1 Sep. 22, 2022

(30) Foreign Application Priority Data

Mar. 18, 2021 (KR) .......................... 10-2021-0035231

(51) Int. Cl.
*G06T 7/70* (2017.01)
*G06T 7/00* (2017.01)
(Continued)

(52) U.S. Cl.
CPC .............. *G06T 7/0004* (2013.01); *G06T 7/70* (2017.01); *G06V 10/87* (2022.01); *G06V 10/98* (2022.01);
(Continued)

(58) Field of Classification Search
CPC ...................... G06T 7/0004; G06T 7/70; G06T 2207/30252; G06T 2207/20081;
(Continued)

(56) References Cited

U.S. PATENT DOCUMENTS

| 10,643,403 B2 * | 5/2020 | Madison ................. G07C 5/12 |
| 10,650,530 B2 | 5/2020 | Hever et al. |
| 2019/0304099 A1 * | 10/2019 | Hever ..................... G06T 7/001 |

FOREIGN PATENT DOCUMENTS

| CN | 112394035 A | * | 2/2021 |
| KR | 10-2011-0089519 A | | 8/2011 |
| KR | 10-2017-0019596 A | | 2/2017 |

OTHER PUBLICATIONS

Heaps; "Car Frame Damage: How to Know if it Happens and What to Do", Mar. 21, 2023 4:00 PM, Kelly Blue Book, https://www.kbb.com/car-advice/vehicle-frame-damage (Year: 2020).*

(Continued)

*Primary Examiner* — Sumati Lefkowitz
*Assistant Examiner* — Michael Adam Shariff
(74) *Attorney, Agent, or Firm* — Fox Rothschild LLP

(57) ABSTRACT

A device for inspecting a vehicle is provided to inhibit side effects of vehicle inspection caused by human errors by determining whether the vehicle is defective according to relative positions of a plurality of objects in an obtained bottom image of the vehicle. The device for inspecting the vehicle includes a first camera that is configured to obtain a bottom image of the vehicle and a processor. The processor recognizes at least one first object and at least one second object in the bottom image of the vehicle, and determines whether the vehicle is defective based on relative positions of the first object and the second object.

14 Claims, 13 Drawing Sheets

(51) Int. Cl.
*G06V 10/70* (2022.01)
*G06V 10/98* (2022.01)
*G07C 5/08* (2006.01)

(52) U.S. Cl.
CPC .. *G07C 5/0866* (2013.01); *G06T 2207/20081* (2013.01); *G06V 2201/08* (2022.01)

(58) Field of Classification Search
CPC .......... G06T 2207/20084; G06V 10/98; G06V 10/87; G06V 2201/08; G06V 10/82; G07C 5/0866; G07C 5/0841; G07C 5/085; G06N 3/02; G06N 3/08; G06N 20/00
See application file for complete search history.

(56) References Cited

OTHER PUBLICATIONS

Seelye How do you know if your car has chassis damage? Quora.com; https://www.quora.com/How-do-you-know-if-your-car-has-chassis-damage; 2021, Former Auto parts sales (Year: 2021).*
Office Action issued on Oct. 29, 2024, in Korean patent application KR 10-2021-0035231.

* cited by examiner

FIG. 5B

|  | P1 | P2 | P3 |
|---|---|---|---|
| A1 | (0.68, 330) | (0.7, 30) | (0.5, 70) |
| A2 | (0.45, 290) | (0.9, 310) | (0.95, 20) |
| ... |  |  |  |

INSPECTION DEVICE FOR VEHICLE AND METHOD FOR INSPECTING THE VEHICLE

CROSS-REFERENCE TO RELATED APPLICATION

The present application claims priority to Korean Patent Application No. 10-2021-0035231, filed on Mar. 18, 2021, the entire contents of which is incorporated herein for all purposes by this reference.

TECHNICAL FIELD

The present disclosure relates to a vehicle and a method of controlling the same, and more particularly, to an inspection device for a vehicle that detects a defect in the bottom of the vehicle and a method for inspecting the vehicle.

BACKGROUND ART

In general, vehicles that have been assembled in automobile manufacturing plants are inspected to check the driving performance, braking performance, and emission performance, and operations of electronic components while engines of the vehicles are turned on, and then conditions of parts and water or oil leakage from engines, transmissions, air conditioners, and the like are visually inspected from the bottom of the vehicles.

However, when the bottom of a vehicle is visually inspected, a worker needs to maintain a posture looking up for a long period of time under the vehicle and this posture may cause an injury to the worker. In addition, when visually inspecting the bottom of the vehicle as described above, there is a possibility of omission of inspection items due to a worker's mistake making it difficult to manage a history of inspection items.

SUMMARY

The present disclosure is directed to providing an inspection device for a vehicle and a method for inspecting the vehicle, the device and method capable of inhibiting side effects of vehicle inspection caused by human errors by determining whether the vehicle is defective according to relative positions of a plurality of objects in an obtained bottom image of the vehicle.

One aspect of the present disclosure provides a device for inspecting a vehicle that may include: a first camera configured to obtain a bottom image of the vehicle; and a processor, wherein the processor is configured to recognize at least one first object and at least one second object in the bottom image of the vehicle, and determine whether the vehicle is defective based on relative positions of the first object and the second object.

The processor may be configured to recognize a predetermined object as the first object in the bottom image of the vehicle, and recognize an object to be inspected as the second object in the bottom image of the vehicle. When the processor fails to recognize one of a plurality of predetermined objects, the processor may be configured to recognize the other predetermined objects as first objects except for the object failed to be recognized.

The processor may be configured to calculate a relative distance between the first object and the second object based on a distance between the first object and the second object in the bottom image of the vehicle and sizes of the first object and the second object in the bottom image of the vehicle, and determine whether the vehicle is defective based on the relative distance. The processor may be configured to calculate a relative angle between the first object and the second object based on the bottom image of the vehicle, and determine whether the vehicle is defective based on the relative angle.

Additionally, the processor may be configured to determine at least one of the second objects as a third object, calculate a relative distance between the third object and the second object not determined as the third object based on the bottom image of the vehicle, and determine whether the vehicle is defective based on the relative distance between the third object and the second object not determined as the third object. The processor may be configured to recognize the first object and the second object by analyzing the bottom image of the vehicle by machine learning. The processor may be configured to generate a trained model based on a reference bottom image of the vehicle, and recognize the first object and the second object based on the trained model.

The device may further include a second camera configured to obtain an exterior appearance image of the vehicle, wherein the processor may be configured to determine a vehicle model of the vehicle based on the exterior appearance image of the vehicle, determine a trained model corresponding to the vehicle model of the vehicle among a plurality of trained models based on the determined vehicle model of the vehicle, and recognize the first object and the second object based on the determined trained model. Further, the processor may be configured to determine that the vehicle is normal, when a position of the second object in the bottom image of the vehicle is within a threshold distance from the second object of a reference bottom image of the vehicle. The device may further include a display, wherein the processor may be configured to operate the display to display whether the vehicle is defective. The device may further include a memory, wherein the processor may be configured to store information on whether the vehicle is defective in the memory.

Another aspect of the present disclosure provides a method of inspecting a vehicle, the method may include: obtaining a bottom image of the vehicle; recognizing at least one first object and at least one second object in the bottom image of the vehicle; and determining whether the vehicle is defective based on relative positions of the first object and the second object. The recognizing of at least one first object and at least one second object may include: recognizing a predetermined object as the first object in the bottom image of the vehicle; and recognizing an object to be inspected as the second object in the bottom image of the vehicle. The recognizing of a predetermined object as the first object in the bottom image of the vehicle may include, when the processor fails to recognize one of a plurality of predetermined objects, recognizing the other predetermined objects as first objects except for the object failed to be recognized.

The method may further include calculating a relative distance between the first object and the second object based on a distance between the first object and the second object in the bottom image of the vehicle and sizes of the first object and the second object in the bottom image of the vehicle, wherein the determining whether the vehicle is defective based on relative positions of the first object and the second object may include determining whether the vehicle is defective based on the relative distance. The method may further include: calculating a relative angle between the first object and the second object based on the bottom image of the vehicle; and determining whether the vehicle is defective based on the relative angle.

Additionally, the method may include: determining at least one of the second objects as a third object; calculating a relative distance between the third object and the second objects not determined as the third object based on the bottom image of the vehicle; and determining whether the vehicle is defective based on the relative distance between the third object and the second objects not determined as the third object. The recognizing of at least one first object and at least one second object may include recognizing the first object and the second object by analyzing the bottom image of the vehicle by machine learning.

The method may further include generating a trained model based on the reference bottom image of the vehicle, wherein the recognizing of at least one first object and at least one second object may include recognizing the first object and the second object based on the trained model. The method may further include: obtaining an exterior appearance image of the vehicle; determining a vehicle model of the vehicle based on the exterior appearance image of the vehicle; and determines a trained model corresponding to the vehicle model of the vehicle among a plurality of trained models based on the determined vehicle model of the vehicle, wherein the recognizing of at least one first object and at least one second object may further include recognizing the first object and the second object based on the determined trained model.

Additionally, the method may include determining that the vehicle is normal, when a position of the second object in the bottom image of the vehicle is within a threshold distance from the second object of a reference bottom image of the vehicle. The method may further include operating a display to display whether the vehicle is defective. The method may further include storing information on whether the vehicle is defective in a memory.

According to the present disclosure, provided is an inspection device for a vehicle and a method for inspecting the device, the device and method capable of inspecting the bottom of the vehicle based on a position of an object to be inspected relative to a predetermined object pre-set by a user.

DESCRIPTION OF DRAWINGS

FIG. 5B is a table listing relative distances and relative angles between the first objects and the second objects.

DETAILED DESCRIPTION

Figure 1:
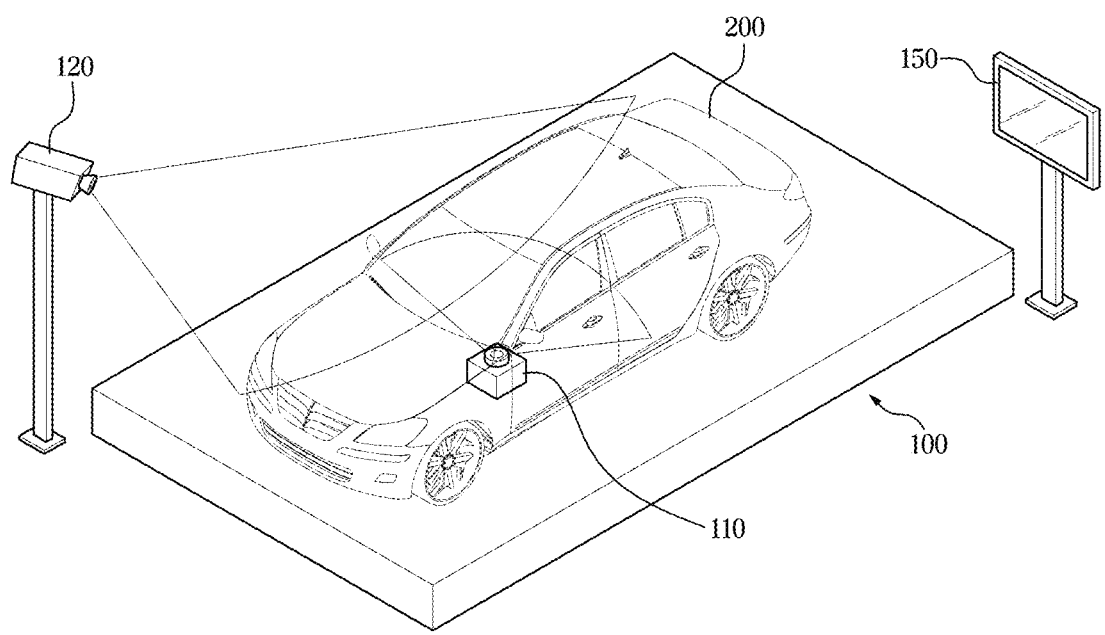
FIG. 1 is a view illustrating an exterior appearance of a vehicle inspection device according to an embodiment.

Throughout the specification, like reference numerals refer to like elements throughout. This specification does not describe all elements of the embodiments of the present disclosure and detailed descriptions on what are well known in the art or redundant descriptions on substantially the same configurations may be omitted. The terms 'unit, module, member, and block' used herein may be implemented using a software or hardware component. According to an embodiment, a plurality of 'units, modules, members, and blocks' may also be implemented using an element and one 'unit, module, member, and block' may include a plurality of elements.

Throughout the specification, when an element is referred to as being "connected to" another element, it may be directly or indirectly connected to the other element and the "indirectly connected to" includes connected to the other element via a wireless communication network. Also, it is to be understood that the terms "include" or "have" are intended to indicate the existence of elements disclosed in the specification, and are not intended to preclude the possibility that one or more other elements may exist or may be added.

Throughout the specification, it will be understood that when one element, is referred to as being "on" another element, it can be directly on the other element, or intervening elements may also be present therebetween. Throughout the specification, terms "first", "second", and the like are used to distinguish one component from another, without indicating alignment order, manufacturing order, or importance of the components.

An expression used in the singular encompasses the expression of the plural, unless otherwise indicated. The reference numerals used in operations are used for descriptive convenience and are not intended to describe the order of operations and the operations may be performed in a different order unless the order of operations are clearly stated.

Figure 2:
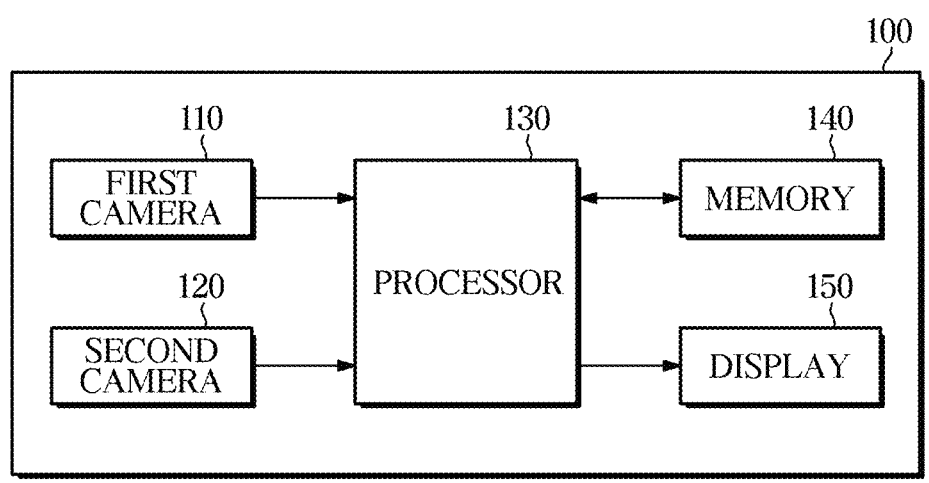
FIG. 2 is a control block diagram of a vehicle inspection device according to an embodiment

Hereinafter, operating principles and embodiments of the present disclosure will be described with reference to the accompanying drawings. FIG. 1 is a view illustrating an exterior appearance of a vehicle inspection device according to an embodiment. FIG. 2 is a control block diagram of the vehicle inspection device according to an embodiment.

Referring to FIGS. 1 and 2, a vehicle inspection device 100 may include a first camera 110, a second camera 120, a processor 130, a memory 140, and a display 150. The first camera 110 may be configured to acquire a bottom image 300 of a vehicle 200. Specifically, the first camera 110 may be configured to capture an image of the bottom of the vehicle 200 to obtain image information on the condition of parts of the bottom of the vehicle 200, engine condition, and water or oil leakage of a transmission and an air conditioner.

The first camera 110 may be disposed at any position of the vehicle inspection device 100 as long as an image of the bottom image 300 of the vehicle 200 may be obtained. The first camera 110 may be configured to transmit the obtained bottom image 300 of the vehicle 200 to the processor 130. The processor 130 may be configured to recognize at least one first object 301 and at least one 302 in the bottom image 300 of the vehicle 200.

The processor 130 may be configured to recognize a predetermined object as the first object 301 in the bottom image 300 of the housing vehicle 200. The first object 301 may be a bolt, clamp, cap, or the like having a predetermined shape and position at the bottom of the vehicle 200. In other words, the first object 301 may be a part always located at the same position at the bottom of the vehicle 200. Since the position of the first object 301 is not changed even when the position of an object to be inspected is changed at the bottom of the vehicle 200, it may be determined whether the position of the object to be inspected is changed with reference to the first object 301.

The processor 130 may be configured to recognize the object to be inspected as the second object 302 in the bottom image 300 of the vehicle 200. The second object 302 may be a part located at the bottom of the vehicle 200 whose shape or position of the second object 302 may be changed. The processor 130 may be configured to determine whether the vehicle 200 is defective based on a relative position of the second object 302 with reference to the first object 301. A reference bottom image 400 of the vehicle 200 may be a bottom image 300 of the vehicle 200 used as a reference when the processor 130 analyzes the obtained bottom image 300 of the vehicle 200. The reference bottom image 400 of the vehicle 200 may be provided in plural in number. In addition, the reference bottom image 400 may be pre-stored in the memory 140.

The processor 130 may be configured to determine whether the vehicle 200 is defective based on relative positions of the first object 301 and the second object 302 included in the bottom image 300 of the vehicle 200 obtained by the first camera 110 and relative positions of the first object 301 and the second object 302 included in the reference bottom image 400 of the vehicle 200. In other words, in response to determining that the position of the second object 302 relative to that of the first object 301 is abnormal in the bottom image 300 of the vehicle 200, the processor 130 may be configured to determine that the vehicle 200 is defective.

The processor 130 may be configured to store information on whether the vehicle 200 is defective in the memory 140. Additionally, the processor 130 may be configured to operate the display 150 to display whether the vehicle 200 is defective. The display 150 may provide a user with a variety of information as an image. In other words, the display 150 may be configured to visually provide information on the inspection results of the bottom of the vehicle 200. For example, when the processor 130 determines that the vehicle 200 is defective due to the position of the object to be inspected being abnormal, the display 150 may be configured to display that the vehicle 200 is defective on a screen. The processor 130 may be configured to recognize the first object 301 and the second object 302 by analyzing the bottom image 300 of the vehicle 200 by machine learning.

Machine learning refers to a process of optimizing parameters using given data by using a model consisting of a plurality of parameters. Machine learning may include supervised learning, unsupervised learning, and reinforcement learning depending on the type of tasks to be learned. Supervised learning is learning about mapping between input and output and may be applied to a case in which input and output pairs are given as data. Unsupervised learning is applied to a case in which only inputs are used without outputs and find out regularity between inputs. The processor 130 may also be configured to recognize an object by deep learning as well as machine learning and recognize the object using various methods.

The processor 130 may be configured to generate a trained model based on the reference bottom image 400 of the vehicle 200 and recognize the first object 301 and the second object 302 based on the trained model. In this regard, the trained model may be generated by learning using data of a plurality of reference bottom images 400. Specifically, the user may select a bolt, clamp, cap, or the like in the reference bottom image 400 as the first object 301. In particular, the processor 130 may be configured to create labeling data of the first object 301. In addition, the user may select an object to be inspected in the reference bottom image 400 as the second object 302, and the processor 130 may be configured to create labeling data of the second object 302.

The processor 130 may be configured to generate the trained model based on the reference bottom image 400, the labeling data of the first object 301, and the labeling data of the second object 302. The processor 130 may be configured to store the position of the second object 302 in the reference bottom image 400 in the memory 140. Additionally, the processor 130 may be configured to store data of a relative distance between the first object 301 and the second object 302 in the reference bottom image 400 and a relative angle between the first object 301 and the second object 302 in the reference bottom image 400, in the memory 140.

Meanwhile, the reference bottom image 400 may vary according to a vehicle model of the vehicle 200, and the trained model may also vary according to data of the reference bottom image 400 of the vehicle model. Therefore, a plurality of trained models may be provided and may vary according to the vehicle model of the vehicle 200.

The second camera 120 may be configured to obtain an exterior appearance image of the vehicle 200. The second camera 120 may be disposed at any position of the vehicle inspection device 100 as long as the exterior appearance image of the vehicle 200 may be obtained. The second camera 120 may be configured to transmit the obtained exterior appearance image of the vehicle 200 to the processor 130.

The processor 130 may be configured to determine a vehicle model of the vehicle 200 based on the exterior appearance image of the vehicle 200. In particular, information on the vehicle model may be stored in the memory 140. In other words, the processor 130 may be configured to retrieve image information of the vehicle 200 corresponding to the obtained exterior appearance image of the vehicle 200 from the memory 140 and determine a vehicle model corresponding to the retrieved image information of the vehicle 200 as the vehicle model of the vehicle 200.

The processor 130 may be configured to determine one trained model corresponding to the determined vehicle model among the plurality of trained models based on the determined vehicle model of the vehicle 200. Particularly, the processor 130 may be configured to recognize the first object 301 and the second object 302 in the bottom image 300 of the vehicle 200 based on the determined trained model. The processor 130 configured to perform operations as described above or to be described below may be implemented using at least one memory 140 configured to store data on algorithms to execute the operations of components of the vehicle inspection device 100 or programs to run the algorithms, and perform the above-described operation using data stored in the at least one memory 140.

The memory 140 may be configured to store programs configured to perform operations as described above or to be described below, and the processor 130 may be configured to execute the stored programs. When the memory 140 and the processor 130 are provided in plural, they may be integrated into a single chip or provided at physically separated positions. The memory 140 may include a volatile memory temporarily storing data such as static random-access memory (S-RAM) and dynamic random-access memory (D-RAM). Also, the memory 140 may include a non-volatile memory storing control programs and control data for a long period of time such as read only memory (ROM), erasable programmable ROM (EPROM), and electrically erasable programmable ROM (EEPROM). The processor 130 may include various logic circuits and arithmetic circuits and may process data in accordance with a program provided by the memory 140 and generate a control signal in accordance with processing results.

Figure 3A:
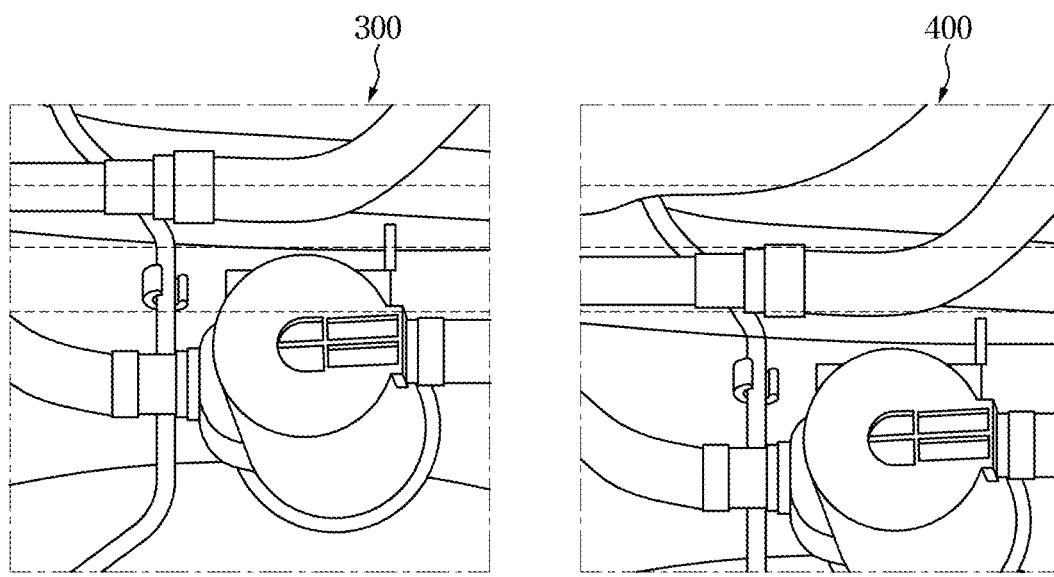
FIGS. 3A and 3B are diagrams for describing a method of inspecting the bottom of a vehicle according to the prior art.
Figure 3B:
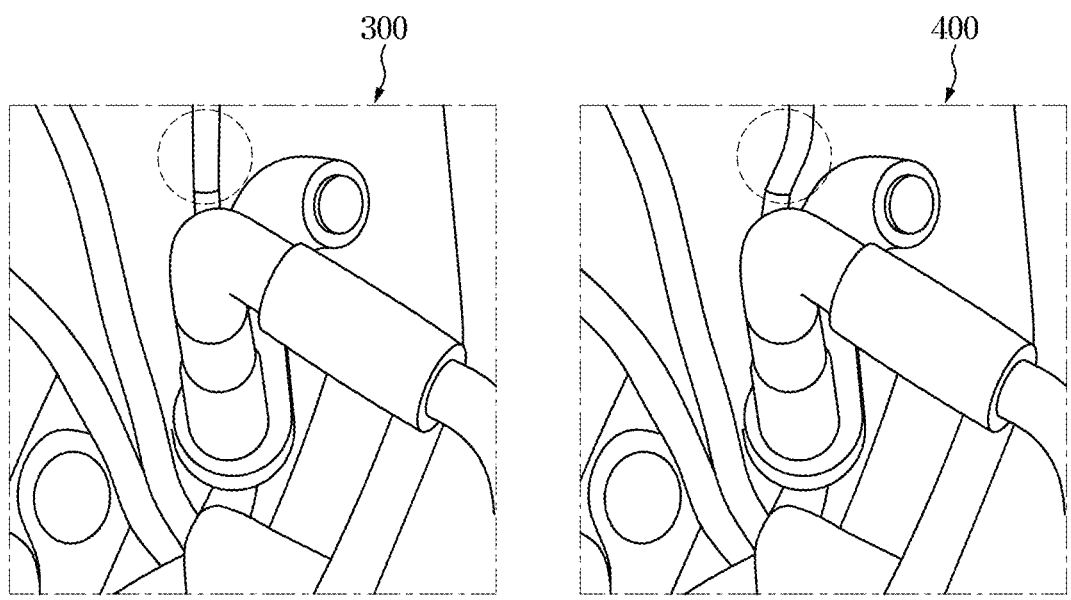

FIGS. 3A and 3B are diagrams for describing a method of inspecting a vehicle according to the prior art. Referring to FIG. 3A, according to the prior art, a camera attached to the floor may capture images of the bottom of a vehicle while the vehicle moves in a direction of travel or a camera moving on the floor may capture images of the bottom of a stopped vehicle. In particular, different bottom images of the vehicle may be obtained according to the position of the vehicle. In other words, the camera may be configured to capture different positions of the bottom of the vehicle in accordance with a slight difference of the position of the vehicle with reference to the camera.

According to the prior art, when the bottom image of the vehicle obtained by the camera is different from the reference bottom image of the vehicle, it may be determined that the vehicle to be inspected is defective. Particularly, when the camera obtains an image of a position different from a desired position of the bottom of the vehicle due to a slight difference of the position of the vehicle, the bottom image of the vehicle is different from the reference bottom image of the vehicle resulting in misjudgment that the vehicle is defective although all parts of the bottom of the vehicle are located at normal positions.

Referring to FIG. 3B, according to the prior art, a portion of the bottom image obtained by the camera different from that of the reference bottom image may be determined as a defect by comparison therebetween. Wires made of soft materials such as fuel hoses and cables may be attached to the bottom of the vehicle. In particular, parts such as the fuel hoses and cables having different shapes or located at different positions from those of the reference bottom image may not affect performance of the vehicle.

Additionally, the bottom of the vehicle may be contaminated by a simple contaminant or foreign matter, which may not be related to the defects of the parts of the bottom of the vehicle. However, when shapes of the fuel hoses and cables are different, positions of the fuel hoses and cables are different, or the bottom of the vehicle is partially contaminated with a simple contaminant or foreign matter, there may be a problem that the vehicle to be inspected is determined as defective by simple comparison between the obtained bottom image of the vehicle and the reference bottom image of the vehicle according to the prior art although no problem is caused thereby.

Figure 4A:
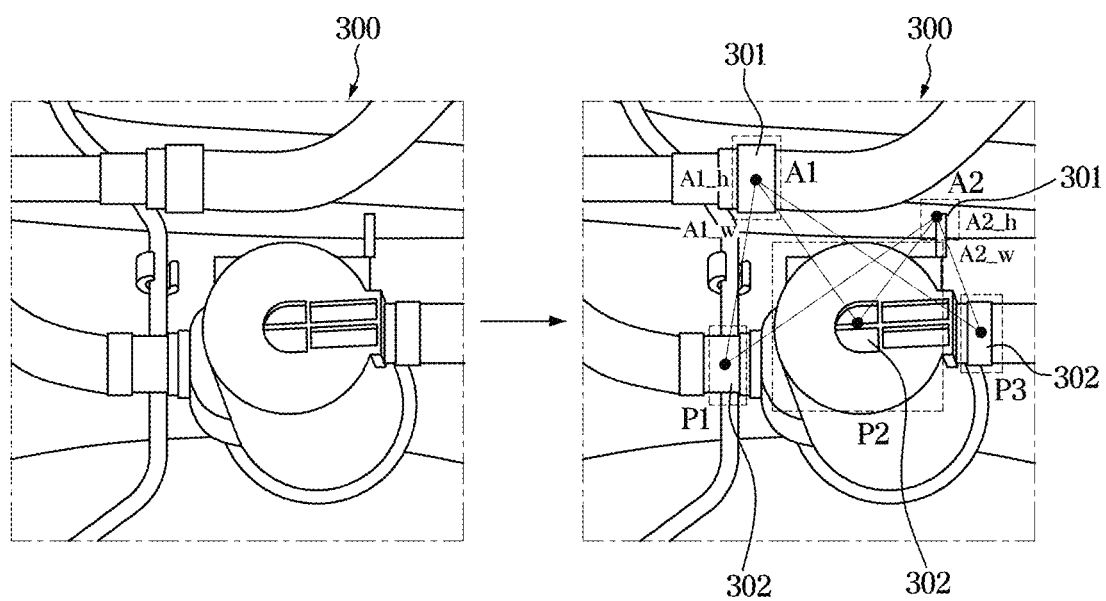
FIG. 4A is a diagram illustrating an example of recognizing a first object and a second object in a bottom image of a vehicle.
Figure 4B:
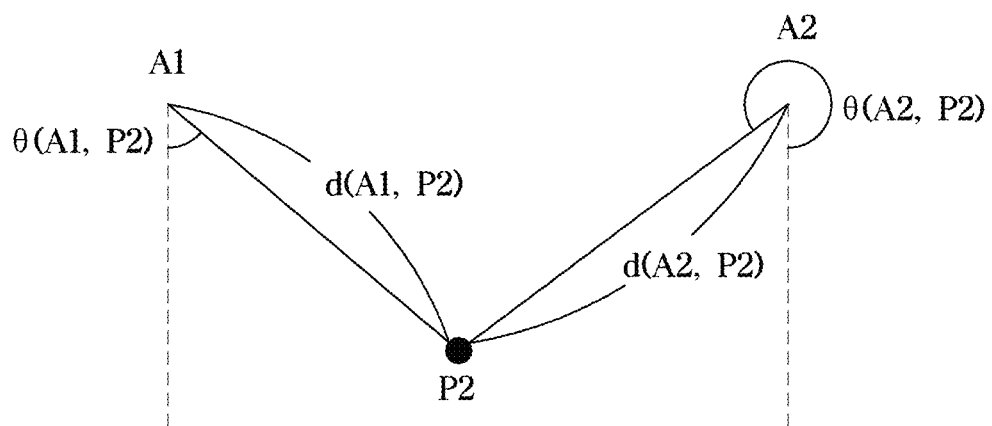
FIG. 4B is a diagram illustrating a relative distance and a relative angle between the first object and the second object.

FIG. 4A is a diagram illustrating an example of recognizing a first object and a second object in a bottom image of a vehicle. FIG. 4B is a diagram illustrating a relative distance and a relative angle between the first object and the second object. Referring to FIG. 4A, a bottom image 300 of a vehicle 200 obtained by the first camera 110 may be inspected. In addition, the processor 130 may be configured to recognize a first object 301 and a second object 302.

A user may pre-set A1 (clamp) and A2 (bolt) as first objects 301 in a reference bottom image 400 of the vehicle 200. In particular, the processor 130 may be configured to recognize A1 and A2 as the first objects 301 in the bottom image 300 of the vehicle 200. In addition, the second object 302, like the first object 301, may be provided in plural. For example, the processor 130 may be configured to recognize P1, P2, and P3 to be inspected as second objects 302.

The processor 130 may be configured to determine whether the vehicle 200 is defective based on relative positions of the first object 301 and the second object 302. For example, the processor 130 may be configured to determine whether the vehicle 200 is defective based on relative positions of A1 and P1, relative positions of A1 and P2, relative positions of A1 and P3, relative positions of A2 and P1, relative positions of A2 and P2, and relative positions of A2 and P3.

When the processor 130 fails to recognize one of the predetermined objects, the processor 130 may be configured to recognize the other predetermined objects as the first objects 301 except for the object failed to be recognized. For example, when the processor 130 fails to recognize A2 (bolt) as the first object 301 in the bottom image 300 of the vehicle 200, the processor 130 may be configured to recognize only A1 (clamp) as the first object 301 and use relative positions of the second objects 302 with reference to only A1.

The processor 130 may be configured to determine at least one second object 302 as a third object. For example, the processor 130 may be configured to determine P1 as the third object among P1, P2, and P3 in the bottom image 300 of the vehicle 200. Based on the bottom image 300 of the vehicle 200, the processor 130 may be configured to calculate a relative distance and a relative angle between the third object and the second objects 302, which are not determined as the third object. In addition, the processor 130 may be configured to determine whether the vehicle 200 is defective based on the relative distance and the relative angle between the third object and the second objects 302, which are not determined as the third object.

For example, the processor 130 may be configured to calculate a relative distance and a relative angle between P1, determined as the third object, and P2 and P3, which are second objects 302 not determined as the third object, respectively. In particular, the processor 130 may be configured to determine whether the vehicle 200 is defective based on the relative position and the relative angle between P1 and P2 and the relative position and relative angle between P1 and P3.

Referring to FIG. 4B, relative positions between each of A1 and A2, recognized as the first objects 301, and P2, recognized as the second object 302. The processor 130 may be configured to calculate the relative distance between the first object 301 and the second object 302 based on a distance between the first object 301 and the second object 302 in the bottom image 300 of the vehicle 200 and sizes of the first object 301 and the second object 302 in the bottom image 300 of the vehicle 200.

Although the processor 130 may be configured to determine whether the vehicle 200 is defective based on the distance between the first object 301 and the second object 302 in the bottom image 300 of the vehicle 200, there may be a problem unless a distance between the vehicle 200 and the first camera 110 is maintained constant. In other words, since the distance between the first object 301 and the second object 302 in the bottom image 300 of the vehicle 200 may vary according to the distance between the vehicle 200 and the first camera 110, it is preferable to determine whether the vehicle 200 is defective based on the relative distance between the first object 301 and the second object 302 instead of the distance between the first object 301 and the second object 302 in the bottom image 300 of the vehicle 200 to detect a defect of the vehicle 200 regardless of the distance between the vehicle 200 and the first camera 110.

In addition, when the processor 130 determines whether the vehicle 200 is defective based on the distance between the first object 301 and the second object 302 in the bottom image 300 of the vehicle 200, there may be a problem unless the vehicle 200 is always inspected at the same position with reference to the first camera 110. The position of the vehicle 200 relative to the vehicle inspection device 100 may be changed slightly at every inspection of the vehicle 200. Particularly, the distance between the first object 301 and the second object 302 in the bottom image 300 of the vehicle 200 may also be changed at every inspection. Therefore, it may be preferable to determine whether the vehicle 200 is defective based on the relative distance between the first object 301 and the second object 302 instead of the distance between the first object 301 and the second object 302 in the bottom image 300 of the vehicle 200 to determine whether the vehicle 200 is defective regardless of the position of the vehicle 200 relative to the first camera 110.

For example, a distance between A1, as the first object 301, and P2, as the second object 302, in the bottom image 300 of the vehicle 200 may be d(A1,P2). In addition, a vertical length of A1 in the bottom image 300 of the vehicle 200 may be A1_h, and a vertical length of P2 in the bottom image 300 of the vehicle 200 may be P2_h. In particular, the processor 130 may be configured to calculate the relative distance (d'(A1,P2)) between A1 and P2 by dividing d(A1, P2) by a product of A1_h and P2_h, (A1$_{13}$ h×P2_h). In other words, the processor 130 may be configured to calculate the relative distance (d'(A1,P2)) between A1 and P2 according to Equation 1.

$$d'(A1,P2)=d(A1,P2)/(A1\_h \times P2\_h) \quad \text{Equation 1}$$

The processor 130 may be configured to compare the relative distance between the first object 301 and the second object 302 calculated based on the bottom image 300 of the vehicle 200 with a relative distance between the first object 301 and the second object 302 in the reference bottom image 400 of the vehicle 200. In particular, when the relative distance between the first object 301 and the second object 302 calculated based on the bottom image 300 of the vehicle 200 is within a threshold value from the relative distance between the first object 301 and the second object 302 in the reference bottom image 400 of the vehicle 200, the processor 130 may be configured to determine the second object 302 to be inspected or the vehicle 200 to be inspected as normal.

On the contrary, when the relative distance between the first object 301 and the second object 302 calculated based on the bottom image 300 of the vehicle 200 is not within the threshold value from the relative distance between the first object 301 and the second object 302 in the reference bottom image 400 of the vehicle 200, the processor 130 may be configured to determine the second object 302 to be inspected or the vehicle 200 to be inspected as defective.

The processor 130 may be configured to calculate a relative angle between the first object 301 and the second object 302 based on the bottom image 300 of the vehicle 200. For example, the processor 130 may be configured to calculate a relative angle between A1, as the first object 301, and P1, as the second object 302, as θ(A1,P2) and a relative angle between A2, as the first object 301, and P2, as the second object 302, as θ(A2,P2). The processor 130 may be configured to determine whether the vehicle 200 is defective based on the relative angles.

Specifically, the processor 130 may be configured to compare the relative angle between the first object 301 and the second object 302 calculated based on the bottom image 300 of the vehicle 200 with a relative angle between the first object 301 and the second object 302 in the reference bottom image 400 of the vehicle 200. Particularly, when the relative angle between the first object 301 and the second object 302 calculated based on the bottom image 300 of the vehicle 200 is within a threshold value from the relative angle between the first object 301 and the second object 302 in the reference bottom image 400 of the vehicle 200, the processor 130 may be configured to determine the second object 302 to be inspected or the vehicle 200 to be inspected as normal.

On the contrary, when the relative angle between the first object 301 and the second object 302 calculated based on the bottom image 300 of the vehicle 200 is not within a threshold value from the relative angle between the first object 301 and the second object 302 in the reference bottom image 400 of the vehicle 200, the processor 130 may be configured to determine the second object 302 to be inspected or the vehicle 200 to be inspected as defective.

Figure 5A:
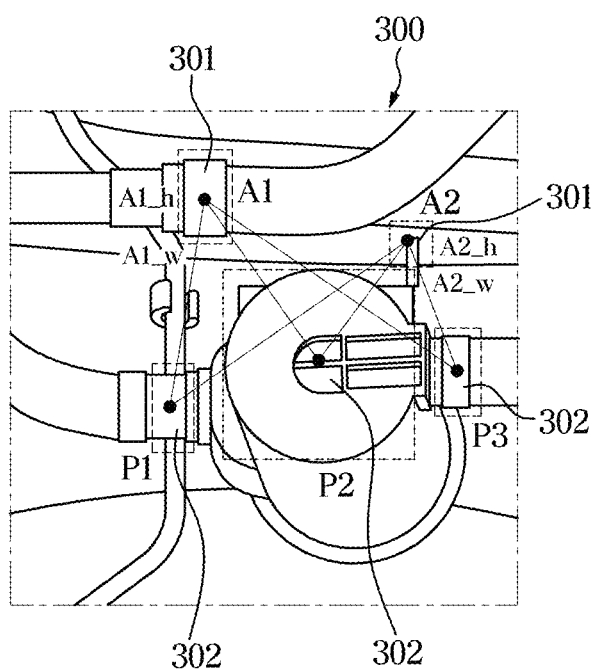
FIG. 5A is a diagram illustrating first objects and second objects recognized in the bottom image of a vehicle.

FIG. 5A is a diagram illustrating first objects and second objects recognized in the bottom image of a vehicle. FIG. 5B is a table listing relative distances and relative angles between the first objects and the second objects. Referring to FIG. 5A, the processor 130 may be configured to recognize A1 and A2 as the first objects 301 and P1, P2 and P3 as the second objects 302.

Referring to the table of FIG. 5B, relative distances of the first objects 301 and the second objects 302 and relative angles between the first objects 301 and the second objects 302 are listed as coordinates. In other words, the relative distance between the first object 301 and the second object 302 does not have one value but may have a plurality of values, i.e., a relative distance between A1 and P1, a relative distance between A1 and P2, a relative distance between A1 and P3, a relative distance between A2 and P1, a relative distance between A2 and P2, and a relative distance between A2 and P3.

In addition, the relative angle between the first object 301 and the second object 302 does not have one value but may have a plurality of values, i.e., a relative angle between A1 and P1, a relative angle between A1 and P2, a relative angle between A1 and P3, a relative angle between A2 and P1, a relative angle between A2 and P2, and a relative angle between A2 and P3. In other words, when each of the plurality of relative distances calculated based on the bottom image 300 of the vehicle 200 is within a threshold value from each of the relative distances between the first objects 301 and the second objects 302 in the reference bottom image 400 of the vehicle 200, the processor 130 may be configured to determine the second objects 302 to be inspected or the vehicle 200 to be inspected as normal.

On the contrary, when any one of the plurality of relative distances calculated based on the bottom image 300 of the vehicle 200 is not within a threshold value from each of the relative distances between the first objects 301 and the second objects 302 in the reference bottom image 400 of the vehicle 200, the processor 130 may be configured to determine the second objects 302 to be inspected or the vehicle 200 to be inspected as defective. In addition, when each of the plurality of relative angles calculated based on the bottom image 300 of the vehicle 200 is within a threshold value from each of the relative angles between the first objects 301 and the second objects 302 in the reference bottom image 400 of the vehicle 200, the processor 130 may be configured to determine the second objects 302 to be inspected or the vehicle 200 to be inspected as normal.

On the contrary, when any one of the plurality of relative angles calculated based on the bottom image 300 of the vehicle 200 is not within a threshold value from each of the relative angles between the first objects 301 and the second objects 302 in the reference bottom image 400 of the vehicle 200, the processor 130 may be configured to determine the second objects 302 to be inspected or the vehicle 200 to be inspected as defective.

Figure 6A:
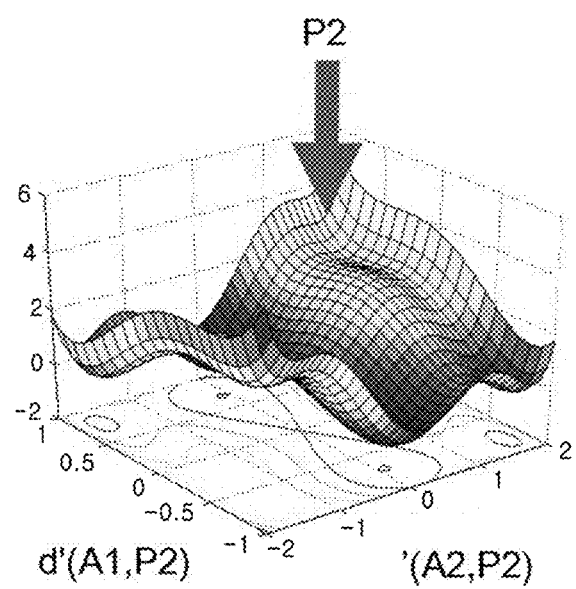
FIG. 6A is a diagram illustrating probability distribution of a relative distance between a first object and a second object based on a reference bottom image.
Figure 6B:
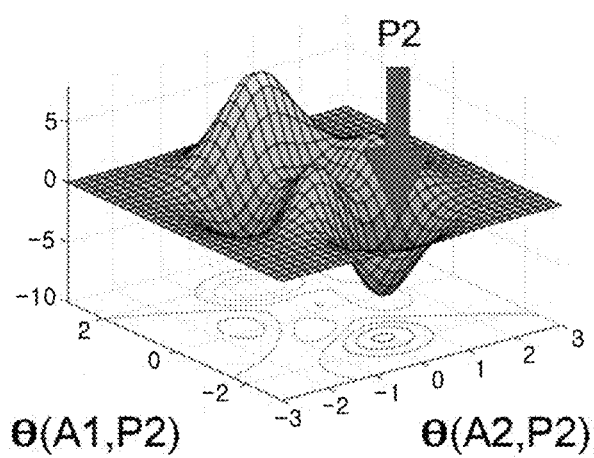
FIG. 6B is a diagram illustrating probability distribution of a relative angle between a first object and a second object based on a reference bottom image.

FIG. 6A is a diagram illustrating probability distribution of a relative distance between first objects 301 and a second object 302 based on a reference bottom image. FIG. 6B is a diagram illustrating probability distribution of a relative angle between first objects 301 and a second object 302 based on a reference bottom image. Referring to FIGS. 6A and 6B, the processor 130 may be configured to determine whether the vehicle 200 is defective using another method instead of the method of determining whether the vehicle 200 is defective based on whether the relative distance of the bottom image 300 is within the threshold value from the relative distance of the reference bottom image 400 and whether the relative angle of the bottom image 300 is within the threshold value from the relative angle of the reference bottom image 400.

Referring to FIG. 6A, when there are two first objects 301, a probability plane, in which relative distances between a particular second object 302 and each of the two first objects 301 are used as axes, may be provided. In this regard, the probability plane may be a plane showing probability distribution of relative distances between a particular second object 302 and each of the first objects 301 based on the reference bottom image 400 of the vehicle 200. In other words, the probability plane of FIG. 6A indicates a probability that the particular second object 302 is located at certain distances relative to the two first objects 301 based on data of a plurality of reference bottom image 400. For example, when A1 and A2 are the first objects 301, referring to FIG. 6A, although P2, as the second object 302, is located at a position in a constant relative distance from A1, i.e., d'(A1,P2) is constant, the probability that P2 is located at the position may vary according to the relative distance between P1 and A2 (d'(A2,P2)).

Referring to FIG. 6B, when there are two first objects 301, a probability plane, in which relative angles between a particular second object 302 and each of the two first objects 301 as axes, may be provided. In this regard, the probability plane may be a plane showing probability distribution of relative angles between the particular second object 302 and each of the first objects 301 based on the reference bottom image 400 of the vehicle 200. In other words, the probability plane of FIG. 6B indicates a probability that the particular second object 302 is located at a certain angle relative to the two first objects 301 based on data of a plurality of reference bottom image 400. For example, when A1 and A2 are the first objects 301, referring to FIG. 6B, although P2, as the second object 302, is located at a position in a constant relative angle from A1, i.e., θ(A1,P2) is constant, the probability that P2 is located at the position may vary according to the relative distance between P1 and A2(θ(A2,P2)).

Referring to FIGS. 6A and 6B, P2 may be located on the coordinates indicated by arrows relative to A1 and A2. In particular, when a low probability in either distance or angle is obtained in the probability plane, the processor 130 may be configured to determine that the second object 302 and the vehicle 200 to be inspected are defective. For example, according to probability distribution values at coordinates (d'(A1,P2), d'(A2,P2)) by the relative distances between P2 and A1 and between P2 and A2, the probability that P2 is present at the position is not low. However, according to probability distribution values at coordinates (θ(A1,P2), θ(A2,P2)) by the relative angles between P2 and A1 and between P2 and A2, the probability that P2 is present at the position is low. Therefore, the processor 130 may be configured to determine that the position of P2 is abnormal or the vehicle 200 to be inspected is defective.

On the contrary, although the probability that P2 is present at the position is not low according to the probability distribution values in the coordinates by the relative angles between P2 and A1 and between P2 and A2 indicated by the arrows, the processor 130 may be configured to determine that the position of P2 is abnormal or the vehicle 200 to be inspected is defective even when the probability that P2 is present at the position is low according to the probability distribution values in the coordinates by the relative distances.

Figure 7:
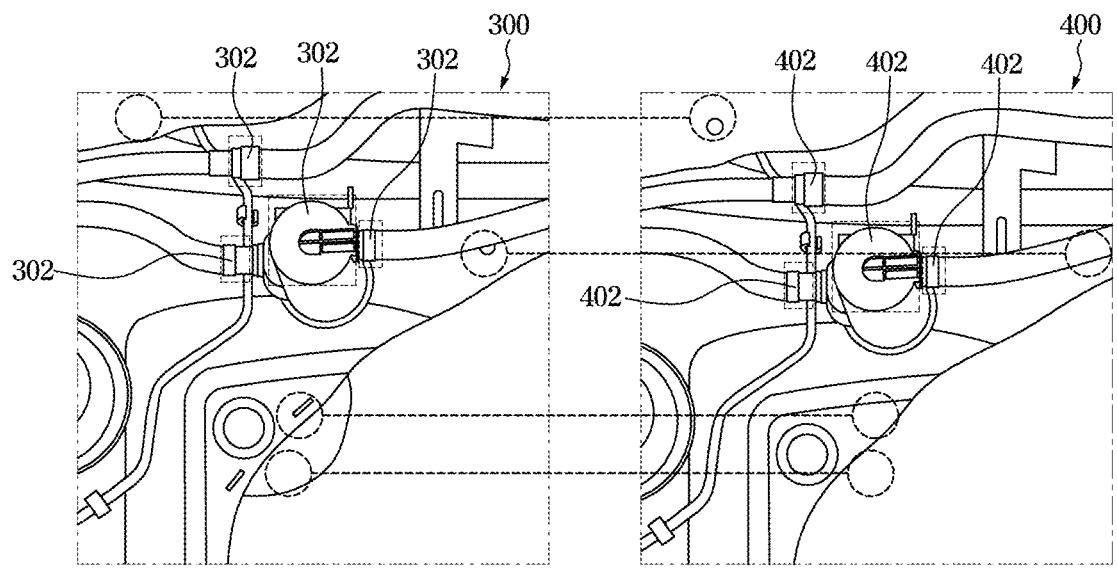
FIG. 7 is a diagram illustrating an example in which a portion of a bottom image of a vehicle which is not an inspection target is different from that of a reference bottom image.

FIG. 7 is a diagram illustrating an example in which a portion of the bottom image of the vehicle which is not an inspection target is different from that of the reference bottom image. Referring to FIG. 7, the bottom image 300 of the vehicle 200 may be slightly different from the reference bottom image 400. For example, portions indicated by circular dotted lines may correspond to each other in the bottom image 300 of the vehicle 200 and the reference bottom image 400. However, although the vehicle models are the same, portions corresponding to each other in the images may be different due to options of the vehicle 200, contamination by foreign matter, or the like.

According to the prior art, defects were determined simply based on difference between the reference bottom image 400 and the bottom image 300 of the vehicle 200, and thus an erroneous determination that the vehicle 200 is detective may be made in the case where there is no actual problem in the above-described situation. However, according to an embodiment of the present disclosure, the user pre-sets an object to be inspected as the second object 302, and defects are detected based on relative positions of the second object 302 and the first object 301, and thus the erroneous determination caused by the prior art may be prevented.

For example, when the portion indicated by the circular dotted line in FIG. 7 is not set as the second object 302, the processor 130 may be configured to determine that the vehicle 200 is normal although the portion of the bottom image 300 of the vehicle 200 is different from that of the reference bottom image 400 of the vehicle 200. Specifically, when a relative position of the second object 302, which is indicated by a rectangular line, with reference to the first object 301 in the bottom image 300 of the vehicle 200 is not different from a relative position thereof in the reference bottom image 400, the processor 130 may be configured to determine that the vehicle 200 is normal.

Meanwhile, according to another embodiment of the present disclosure, when the position of the second object 302 in the bottom image 300 of the vehicle 200 is within a threshold distance from a second object 402 or the reference bottom image 400 of the vehicle 200, the processor 130 may be configured to determine that the vehicle 200 is normal. In other words, the processor 130 may be configured to determine whether the vehicle 200 is defective based on the position of the second object 302 in the bottom image of the vehicle 200 and the position of the second object 402 in the reference bottom image 400 of the vehicle 200 instead of using the relative distance and the relative angle.

Particularly, when the position of the second object 302 in the bottom image 300 of the vehicle 200 is within the threshold distance from the second object 402 in the reference bottom image 400 of the vehicle 200, the processor 130 may be configured to determine that the vehicle 200 is normal without considering the relative position, the relative distance, and the relative angle between the first object 301 and the second object 302.

Meanwhile, when the position of the second object 302 in the bottom image 300 of the vehicle 200 is outside the threshold distance from the second object 402 in the reference bottom image 400 of the vehicle 200, the processor 130 may not immediately determine that the vehicle 200 is abnormal. In other words, the processor 130 may additionally determine whether the vehicle 200 is defective based on relative positions of the first object 301 and the second object 302 in the bottom image 300 of the vehicle 200.

In conclusion, in response to determining that the position of the second object 302 in the bottom image 300 of the vehicle 200 is outside a threshold distance from the second object 402 in the reference bottom image 400 of the vehicle 200 and the position of the second object 302 is abnormal even based on the relative positions between the first object 301 and the second object 302, the processor 130 may be configured to determine that the vehicle 200 is defective. In addition, even when the position of the second object 302 in the bottom image 300 of the vehicle 200 is output the threshold distance from the second object 402 in the reference bottom image 400 of the vehicle 200, the processor 130 may be configured to determine that the second object 302 to be inspected and the vehicle 200 to be inspected are normal upon determination that the position of the second object 302 is normal based on the relative positions between the first object 301 and the second object 302.

At least one component may be added or deleted in response to performance of the above-described components. In addition, it will be readily understood by those skilled in the art that mutual positions of the components may be changed in accordance with performance and structure of a system.

Figure 8:
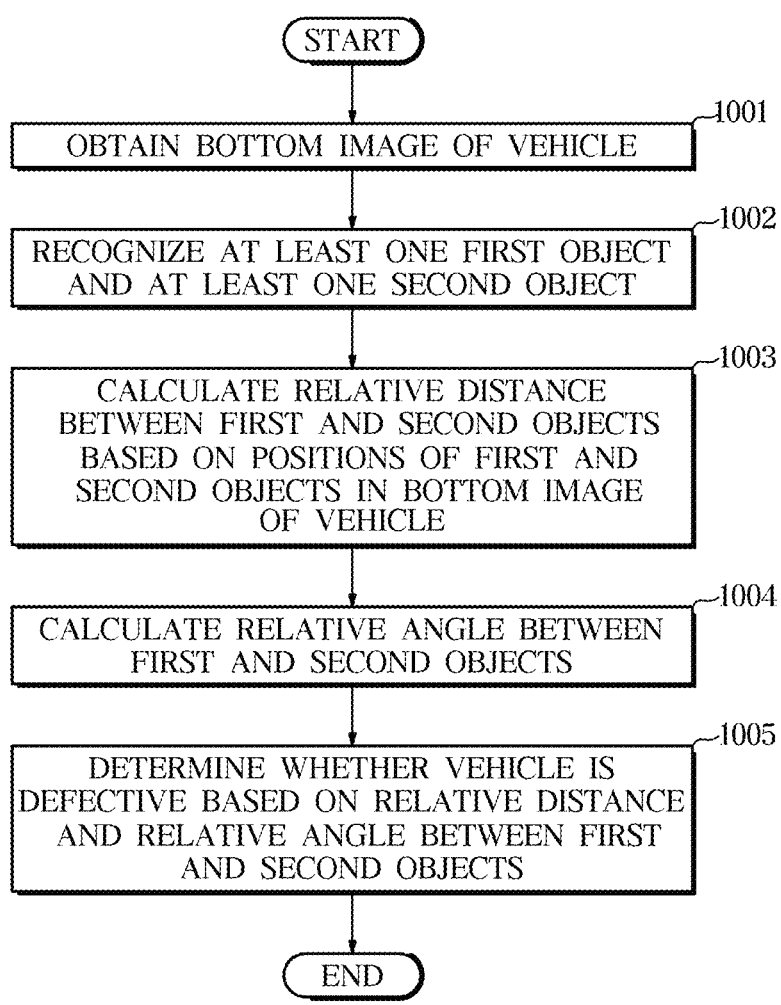
FIG. 8 is a flowchart illustrating a method of inspecting a vehicle according to an embodiment.

FIG. 8 is a flowchart illustrating a method of inspecting a vehicle according to an embodiment. This is merely an exemplary embodiment for achieving the object of the present disclosure and some components may be added or deleted if necessary. Referring to FIG. 8, the first camera 110 may be configured to obtain the bottom image 300 of the vehicle 200 (1001). In this regard, the first camera 110 may be configured to transmit the obtained bottom image 300 of the vehicle 200 to the processor 130.

The processor 130 may be configured to recognize at least one first object 301 and at least one second object 302 in the bottom image 300 of the vehicle 200 (1002). In this regard, the processor 130 may be configured to recognize the first object 301 and the second object 302 by analyzing the bottom image 300 of the vehicle 200 by machine learning. The processor 130 may be configured to recognize a predetermined object as the first object 301 in the bottom image 300 of the vehicle 200 and may recognize an object to be inspected as the second object 302 in the bottom image 300 of the vehicle 200.

The processor 130 may be configured to generate a trained model based on the reference bottom image 400 of the vehicle 200 and recognize the first object 301 and the second object 302 based on the trained model. The processor 130 may be configured to calculate a relative distance between the first object 301 and the second object 302 based on positions of the first object 301 and the second object 302 in the bottom image 300 of the vehicle 200 (1003).

In particular, the processor 130 may be configured to calculate the relative distance between the first object 301 and the second object 302 based on a distance between the first object 301 and the second object 302 in the bottom image 300 of the vehicle 200 and sizes of the first object 301 and the second object 302 in the bottom image 300 of the vehicle 200. The processor 130 may be configured to calculate a relative angle between the first object 301 and the second object 302 based on the bottom image 300 of the vehicle 200 (1004).

The processor 130 may be configured to determine whether the vehicle 200 is defective based on the relative distance and the relative angle between the first object 301 and the second object 302 (1005). For example, when each of a plurality of relative distances calculated based on the bottom image 300 of the vehicle 200 is within a threshold value from each of relative distances between the first objects 301 and the second objects 302 in the reference bottom image 400 of the vehicle 200, the processor 130 may be configured to determine the second objects 302 to be inspected and the vehicle 200 to be inspected as normal.

In addition, when each of a plurality of relative angles calculated based on the bottom image 300 of the vehicle 200 is within a threshold value from each of relative angles between the first objects 301 and the second objects 302 in the reference bottom image 400 of the vehicle 200, the processor 130 may be configured to determine the second objects 302 to be inspected and the vehicle 200 to be inspected as normal. On the contrary, when any one of the plurality of relative distances and angles calculated based on the bottom image 300 of the vehicle 200 is outside a threshold value from each of the relative distances and angles between the first objects 301 and the second objects 302 in the reference bottom image 400 of the vehicle 200, the processor 130 may be configured to determine the second objects 302 to be inspected or the vehicle 200 to be inspected as defective.

Figure 9:
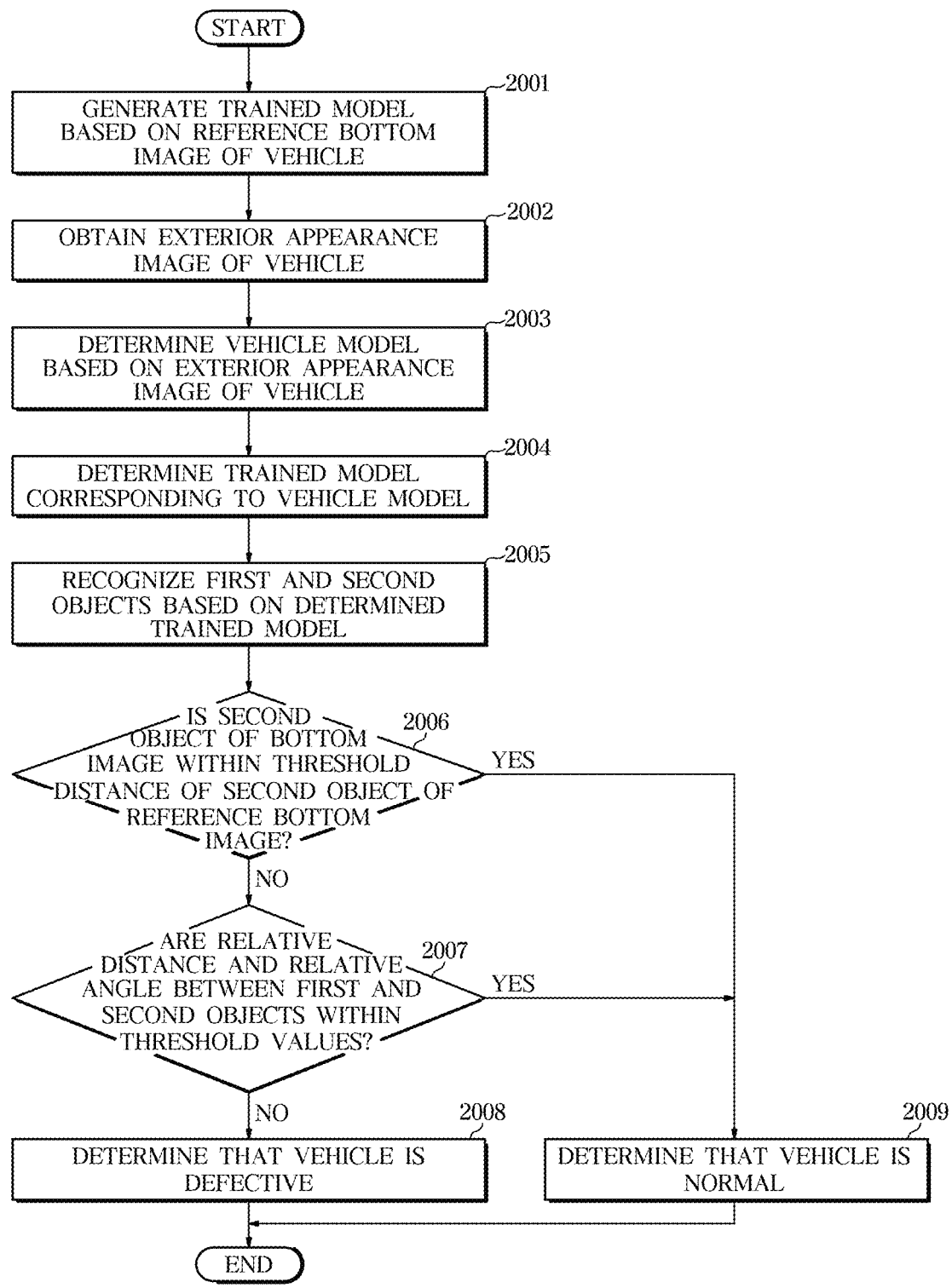
FIG. 9 is a flowchart illustrating a method of inspecting a vehicle according to another embodiment.

According to another embodiment, a low probability in either distance or angle is obtained in the probability plane, the processor 130 may be configured to determine that the second object 302 and the vehicle 200 to be inspected are defective. FIG. 9 is a flowchart illustrating a method of inspecting a vehicle according to another embodiment. Referring to FIG. 9, the processor 130 may be configured to generate a trained model based on the reference bottom image 400 of the vehicle 200 (2001). In this regard, the trained model may be generated by inputting data of a plurality of reference bottom images 400.

Meanwhile, the reference bottom image 400 may vary according to the vehicle model of the vehicle 200, and the trained model may also vary according to data of the reference bottom image 400 of the vehicle model. Therefore, a plurality of trained models may be provided, and the generated trained model may vary according to the vehicle model of the vehicle 200. The second camera 120 may be configured to obtain an exterior appearance image of the vehicle 200. In particular, the second camera 120 may be configured to transmit the obtained exterior appearance image of the vehicle 200 to the processor 130.

The processor 130 may be configured to determine the vehicle model of the vehicle 200 based on the exterior appearance image of the vehicle 200 (2003). In this regard, the processor 130 may be configured to retrieve image information of the vehicle 200 corresponding to the obtained exterior appearance image of the vehicle 200 from the memory 140 and determine a vehicle model corresponding to the retrieved image information of the vehicle 200 as the vehicle model of the vehicle 200 (2004).

The processor 130 may be configured to determine one trained model corresponding to the determined vehicle model among a plurality of trained models based on the determined vehicle model of the vehicle 200. In particular, the processor 130 may be configured to recognize the first object 301 and the second object 302 in the bottom image 300 of the vehicle 200 based on the determined trained model (2005). The processor 130 may be configured to determine whether a position of the second object 302 in the bottom image 300 of the vehicle 200 is within a threshold distance from the second object 402 in the reference bottom image of the vehicle 200 (2006).

When the second object 302 is located within a threshold distance from the second object 402 in the reference bottom image 400 of the vehicle 200 ('Yes' of 2006), the processor 130 may be configured to determine the vehicle 200 to be inspected as normal (2009). When the second object 302 is located out of the threshold distance from the second object 402 in the reference bottom image 400 of the vehicle 200 ('No' of 2006), the processor 130 may be configured to determine whether the relative distance and the relative angle between the first object 301 and the second object 302 are within threshold values, respectively (2007).

When both the relative distance and the relative angle between the first object 301 and the second object 302 are within threshold values ('Yes' of 2007), the processor 130 may be configured to determine the vehicle 200 to be inspected as normal (2009). In this regard, the processor 130 may be configured to operate the display 150 to display that the vehicle 200 is normal. When both the relative distance and the relative angle between the first object 301 and the second object 302 are outside the threshold values ('No' of 2007), the processor 130 may be configured to determine the vehicle 200 to be inspected as defective (2008). In this regard, the processor 130 may be configured to operate the display 150 to display that the vehicle 200 is defective.

The embodiments of the present disclosure have been shown and described above with reference to the accompanying drawings. It will be understood by those of ordinary skill in the art that the present disclosure may be easily modified into other detailed forms without changing the technical principle or essential features of the present disclosure. However, the disclosed embodiments are illustrative and the scope of the present disclosure is not limited thereby.

What is claimed is:

1. A device for inspecting a vehicle, comprising:
a first camera configured to obtain a bottom image of the vehicle;
a second camera configured to obtain an exterior appearance image of the vehicle;
a memory; and
a processor configured to:
generate a plurality of trained models based on a plurality of reference bottom images of the vehicle, the plurality of trained models being varied according to a vehicle model,
store the plurality of trained models in the memory,
determine the vehicle model of the vehicle based on the exterior appearance image of the vehicle,
determine a trained model corresponding to the vehicle model of the vehicle among the plurality of trained models,
recognize a first object and a second object in the bottom image of the vehicle using the determined trained model,
calculate a relative distance between the first object and the second object based on a distance between the first object and the second object in the bottom image of the vehicle and sizes of the first object and the second object in the bottom image of the vehicle according to the determined trained model, and
determine that the vehicle is defective when the relative distance between the first object and the second object is not within a threshold distance.

2. The device of claim 1, wherein the processor is configured to:
recognize a predetermined object as the first object in the bottom image of the vehicle, and
recognize an object to be inspected as the second object in the bottom image of the vehicle.

3. The device of claim 1, wherein when the processor fails to recognize one of a plurality of predetermined objects, the processor is configured to recognize a remaining of the plurality of predetermined objects as first objects except for the object failed to be recognized.

4. The device of claim 1, wherein the processor is configured to:
determine a third object,
calculate a relative distance between the third object and the second object based on the bottom image of the vehicle, and
determine whether the vehicle is defective based on the relative distance between the third object and the second object.

5. The device of claim 1, wherein the processor is configured to determine that the vehicle is normal, in response to determining that a position of the second object in the bottom image of the vehicle is within the threshold distance from the second object of one of the reference bottom images of the vehicle.

6. The device of claim 1, further comprising a display, wherein the processor is configured to operate the display to display whether the vehicle is defective.

7. The device of claim 1,
wherein the processor is configured to store information on whether the vehicle is defective in the memory.

8. A method of inspecting a vehicle, the method comprising:
obtaining, by a processor, a bottom image of the vehicle from a first camera;
obtaining, by the processor, an exterior appearance image of the vehicle from a second camera;
generating, by the processor, a plurality of trained models based on a plurality of reference bottom images of the vehicle, the plurality of trained models being varied according to a vehicle model;
storing, by the processor, the plurality of trained models in a memory;
determining, by the processor, the vehicle model of the vehicle based on the exterior appearance image of the vehicle;
determining, by the processor, a trained model corresponding to the vehicle model of the vehicle among the plurality of trained models;

recognizing, by the processor, a first object and a second object in the bottom image of the vehicle using the determined trained model;

calculating, by the processor, a relative distance between the first object and the second object based on a distance between the first object and the second object in the bottom image of the vehicle and sizes of the first object and the second object in the bottom image of the vehicle according to the determined trained model; and determining, by the processor, that the vehicle is defective when the relative distance between the first object and the second object is not within a threshold distance.

9. The method of claim 8, wherein the recognizing of at least one first object and at least one second object includes:

recognizing, by the processor, a predetermined object as the first object in the bottom image of the vehicle; and recognizing, by the processor, an object to be inspected as the second object in the bottom image of the vehicle.

10. The method of claim 9, wherein the recognizing of a predetermined object as the first object in the bottom image of the vehicle includes, in response to the processor failing to recognize one of a plurality of predetermined objects, recognizing the other predetermined objects as first objects except for the object failed to be recognized.

11. The method of claim 8, further comprising:

determining, by the processor, a third object;

calculating, by the processor, a relative distance between the third object and the second object based on the bottom image of the vehicle; and determining, by the processor, whether the vehicle is defective based on the relative distance between the third object and the second object.

12. The method of claim 8, further comprising determining that the vehicle is normal, in response to determining that a position of the second object in the bottom image of the vehicle is within the threshold distance from the second object of one of the reference bottom images of the vehicle.

13. The method of claim 8, further comprising operating a display to display whether the vehicle is defective.

14. The method of claim 8, further comprising storing information on whether the vehicle is defective in the memory.

* * * * *